United States Patent

[11] 3,581,716

| [72] | Inventor | Richard K. Teed<br>123 Bailey Circle, Greenwood, S.C. 29646 |
|---|---|---|
| [21] | Appl. No. | 853,223 |
| [22] | Filed | Aug. 26, 1969 |
| [45] | Patented | June 1, 1971 |
| [73] | Assignee | Riegel Textile Corporation,<br>Ware Shoals, S.C. |

[54] APPARATUS AND METHOD FOR REMOVING CHAINS OF STITCHES BETWEEN SUCCESSIVE ARTICLES
10 Claims, 6 Drawing Figs.

[52] U.S. Cl. ........................................ 112/252
[51] Int. Cl. ........................................ D05b 65/04, D05b 65/06
[50] Field of Search ........................................ 112/252, 122, 124, 129, 130

[56] References Cited
UNITED STATES PATENTS

| 295,896 | 4/1884 | Beardlee | 112/124 |
|---|---|---|---|
| 1,885,867 | 11/1932 | Sharkey | 112/252 |
| 2,705,466 | 4/1955 | Sargrove et al. | 112/252 |
| 2,803,206 | 8/1957 | Solow | 112/124 |
| 2,989,935 | 6/1961 | Butler | 112/252 |
| 3,068,814 | 12/1962 | George | 112/252X |
| 3,490,403 | 1/1970 | Boucraut | 112/252 |

Primary Examiner—James R. Boler
Attorney—Parrott, Bell, Seltzer, Park & Gibson

ABSTRACT: An apparatus and method for severing and removing chains of stitches formed between successive articles being stitched and advanced along a predetermined longitudinal path of travel including the following components and steps. A first cutting mechanism is actuated by a sensing means sensing the leading edge of each successive article to sever the chain of stitches closely adjacent the leading edge of each article. A suction means is mounted in a position subsequent to the first cutting mechanism for drawing therein and holding the free trailing end of the chain of stitches after cutting thereof by the first cutting mechanism. A second cutting mechanism is mounted adjacent the suction means for severing the chain of stitches closely adjacent the trailing edge of each article, while the chain of stitches is being held by the suction means and while each article is being advanced, to free the remaining leading end of each connecting chain of stitches so that the severed chain of stitches will be removed by the suction means.

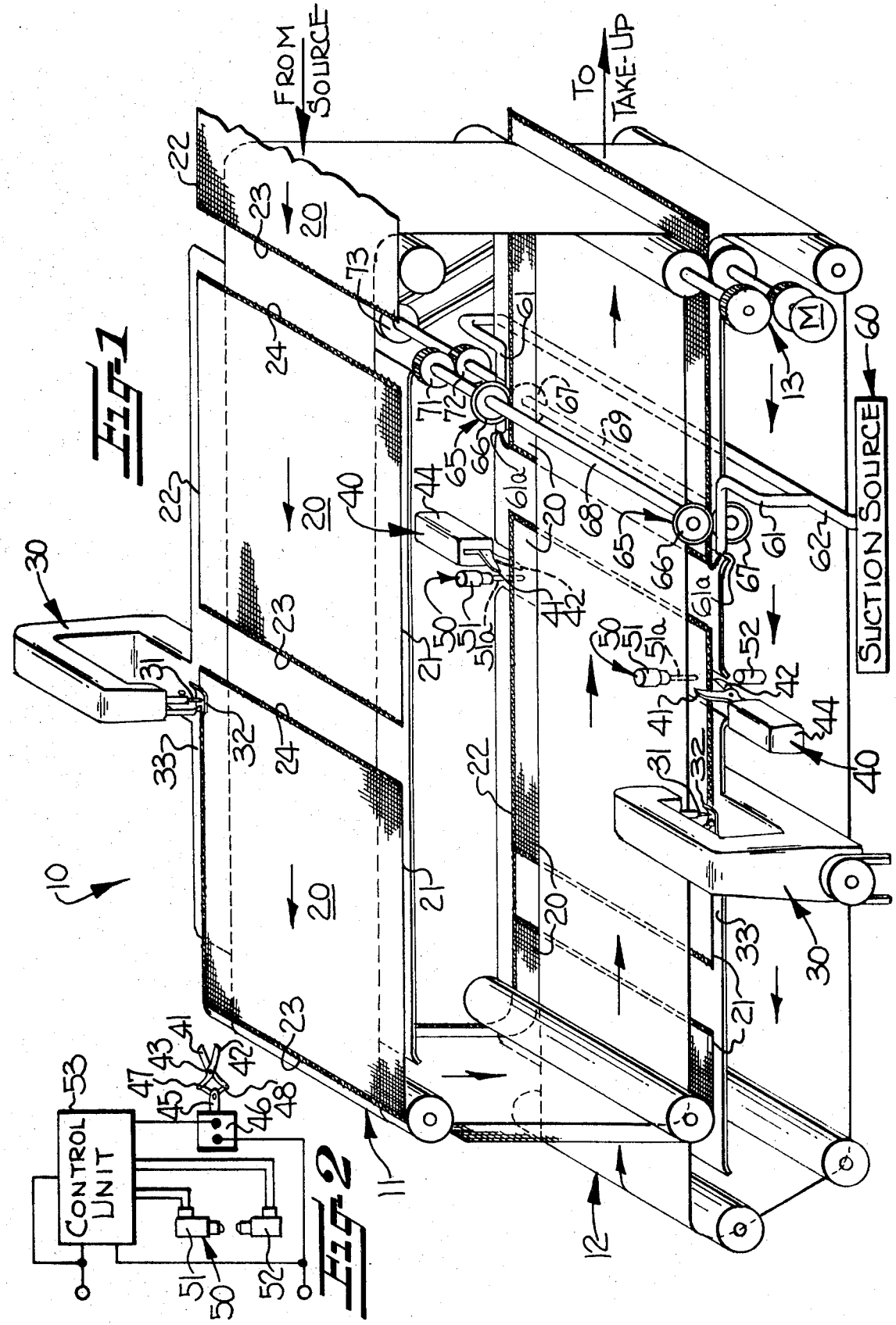

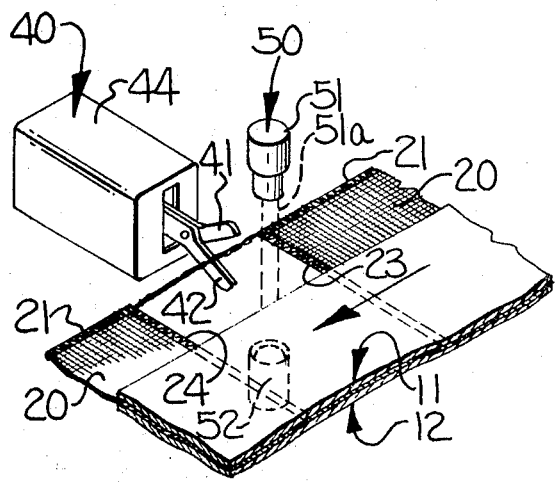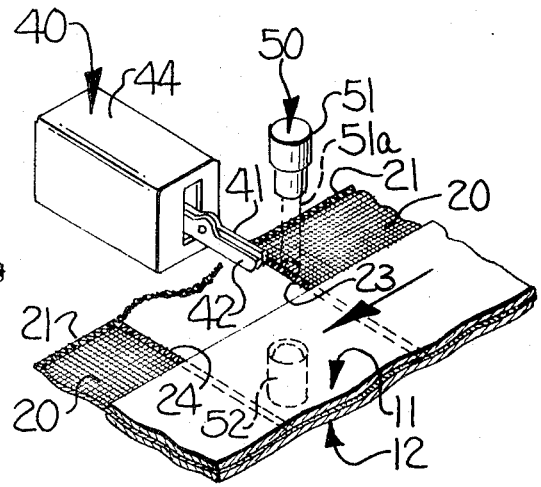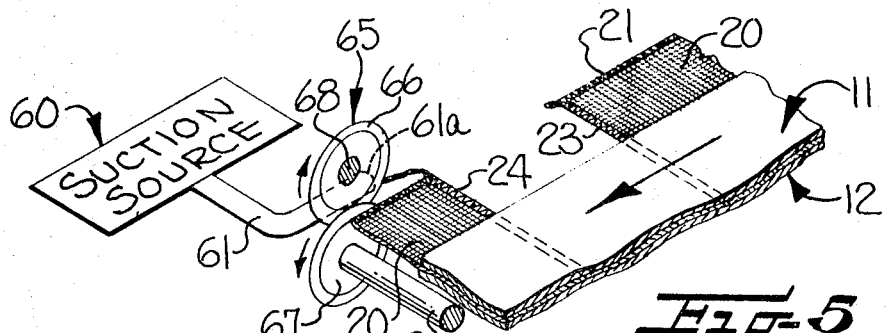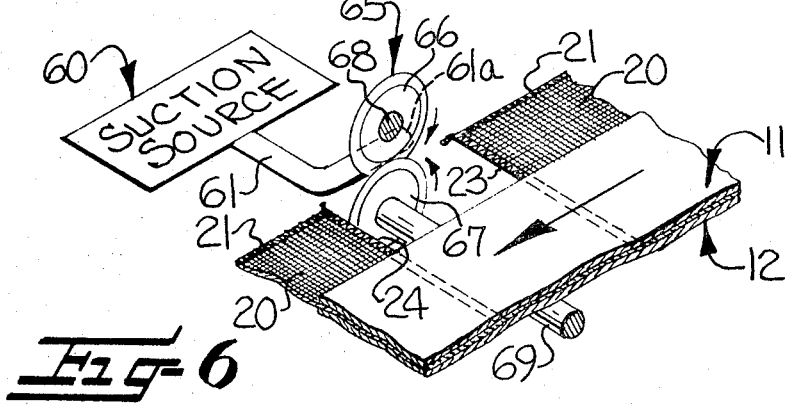

APPARATUS AND METHOD FOR REMOVING CHAINS OF STITCHES BETWEEN SUCCESSIVE ARTICLES

This invention relates to an apparatus and method for removing chains of stitches between successive articles and more particularly to the use of such an apparatus in a machine for stitching and advancing successive articles along a predetermined longitudinal path of travel.

In the manufacture of various articles, stitching operations are required along one or both of the longitudinally extending side edges. These stitching operations are usually performed by feeding successive spaced apart articles past a sewing machine for stitching of the articles along one longitudinal side edge and then feeding each of the spaced apart successive articles past another sewing machine for the stitching of the articles along the other longitudinal side edge, if desired. These sewing machines are usually of the chain stitch type for providing overedge stitching or straight chain stitching along the side edges which results in a connecting chain of stitches extending between successive articles fed past the sewing machines.

With this type of sewing operation, a problem has long been presented of how to effectively remove the connecting chain of stitches between successive articles after stitching thereof. This problem is particularly acute when the nature of the article demands that the connecting chain of stitches be severed and removed closely adjacent the trailing and leading edges of each article. Often, these connecting chains of stitches necessitated manual removal by an operator with a pair of scissors or other cutting device in order to sever the connecting chain of stitches closely adjacent the leading and trailing edges of each article and thus produce a neat article with no tail of stitches extending from either edge thereof.

Also, prior attempts have been made to automatically sever and remove these connecting chains of stitches extending between successive articles after stitching. These attempts include utilizing a single cutting mechanism for cutting the connecting chain at both the trailing and leading edges of successive articles. In other instances, a pair of spaced apart cutters, which act simultaneously to sever the connecting chain of stitches adjacent both the trailing and leading edges, have been used. However, it has been found difficult to properly align the chain of stitches relative to either a single cutter mechanism or a pair of cutter mechanisms acting simultaneously so as to always obtain severing of the connecting chain of stitches closely adjacent both the trailing and leading edges of the articles. Accordingly, no previous apparatus has been found satisfactory for automatically removing the connecting chain of stitches formed between successive articles.

It is, therefore, the object of this invention to provide, in an apparatus having means for advancing a plurality of spaced, successive articles of sheet material having longitudinal side edges, a leading edge and a trailing edge along a predetermined longitudinal path of travel, and stitching means mounted adjacent the moving articles for stitching the articles along at least one longitudinal side edge and forming at least one connecting chain of stitches between the trailing and leading edges of successive articles, the improvement of a method and means for automatically severing and removing the chains of stitches closely adjacent the trailing and leading edges of successive articles.

By this invention, it has been found that the above object may be accomplished by providing a method for severing and removing the chains of stitches comprising the steps of advancing the successive articles with the connecting chains of stitches therebetween along a predetermined path of travel, cutting the connecting chain of stitches closely adjacent the leading edge of each article and thereby freeing the trailing end of each connecting chain of stitches, drawing and holding by suction the free trailing end of the chain of stitches in a generally transverse direction to the path of travel of the successive articles, and severing the chain of stitches closely adjacent the trailing edge of each article while the chain of stitches if being held by suction and while each article is being advanced to free the remaining leading end of each connecting chain of stitches. Preferably, the method also includes the step of sensing the leading edge of each successive article while simultaneously cutting the trailing end of each connecting chain of stitches closely adjacent the leading edge of each successive article By this invention, it has also been found that the above object may be accomplished by providing a means for automatically severing and removing the chains of stitches comprising first cutting means mounted adjacent the moving articles for severing the connecting chain of stitches closely adjacent the leading edge of each article and thereby free the trailing end of each connecting chain of stitches, sensing means operatively connected with the first cutting means and being positioned for sensing the leading edge of each successive article and for actuating the first cutting means in predetermined timed relationship. The means for automatically severing and removing the chains of stitches further comprises suction means mounted adjacent to and in substantial alignment with the path of travel of the moving articles and in a position subsequent to the first cutting means for drawing therein and holding the free trailing end of the chain of stitches after cutting thereof by the first cutting means, and second cutting means mounted adjacent the moving articles and adjacent the suction means in cooperative relationship therewith for severing the chain of stitches closely adjacent the trailing edge of each article while the chain of stitches is being held by the suction means and while each article is being advanced to free the remaining leading end of each connecting chain of stitches so that the severed chain of stitches will be removed by the suction means.

Preferably, a stitching means is mounted adjacent each longitudinal edge of the moving articles for stitching the articles along each longitudinal side edge and forming a connecting chain of stitches between the trailing and leading edges of successive articles along each longitudinal edge thereof, and the means for severing and removing the chains of stitches closely adjacent the trailing and leading edges of successive articles comprises separate means mounted adjacent each longitudinal edge of the moving articles for severing and removing each of the chains of stitches.

Some of the objects of the invention having been stated, other object will appear as the description proceeds, when taken in connection with the accompanying drawings, in which:

FIG. 1 is a schematic perspective view of a portion of an apparatus constructed in accordance with the present invention wherein a plurality of spaced, successive articles of sheet material are advanced therethrough along a predetermined longitudinal path of travel;

FIG. 2 is a schematic wiring diagram of the photoelectric cell detecting means of the apparatus in FIG. 1; and FIGS. 3–6 are schematic perspective views of portions of the apparatus in FIG. 1 illustrating the successive sequence of operations of the apparatus and method utilized in severing and removing a connecting chain of stitches closely adjacent the trailing and leading edges of successive articles.

Referring more specifically to the drawings wherein like reference characters indicate like parts, there is illustrated in FIG. 1 a stitching apparatus generally designated at 10 including the improved means of the present invention.

The stitching apparatus 10 may comprise a pair of cooperating continuous conveyor units generally indicated at 11 and 12 and supported and driven by any suitable arrangement, such as common drive mechanism 13 driven by motor M and suitable support rolls. The conveyor units 11 and 12 advance a plurality of spaced, successive articles 20 of sheet material having longitudinal side edges 21 and 22, a leading edge 23 and a trailing edge 24 along a predetermined longitudinal path of travel as illustrated.

A pair of identical stitching mechanisms 30 of conventional construction having the usual needle arm 31 and presser foot 32 cooperating with an apron 33, are mounted adjacent the path of the longitudinal side edges 21 and 22 of successive articles 20. The stitching mechanisms 30 are arranged to continuously stitch the successive articles 20 along the longitudinal side edges 21 and 22 thereof to form connecting chains of stitches between the trailing edges 24 and leading edges 23 of successive articles 20 along each longitudinal side edge 21 and 22. As illustrated in FIG. 1, the stitching mechanisms 30 are binding the longitudinal side edges 21 and 22 with an overedge stitching. However, this invention is applicable to any type stitching wherein a connecting chain of stitches is formed between successive articles 20.

As previously indicated, the present invention is primarily concerned with the severing of the connecting chains of stitches closely adjacent the trailing and leading edges 24 and 23 of successive articles 20 and the removal of the severed chains of stitches whereby they will not encumber the continued operation of the stitching apparatus 10.

The means for severing and removing the connecting chains of stitches comprises a pair of identical first cutter means 40 mounted adjacent opposite longitudinal side edges 21 and 22 of the moving articles 20 for severing the connecting chains of stitches formed along each longitudinal edge 21 and 22 closely adjacent the leading edge 23 of each successive article, thereby freeing the trailing ends of each connecting chain of stitches. The first cutter means 40 are of the scissors type and each includes a pair of cooperating cutting blades 41 and 42 pivotally connected intermediate their lengths as at 43 and normally positioned in the open condition with blades 41 and 42 on opposite sides of the path of the successive articles 20 such that the connecting chains of stitches will pass therebetween. The blades 41 and 42 extend into a housing 44 wherein they are pivotally connected to the core 45 of a solenoid 46 (FIG. 2) by pivoting links 47 and 48, respectively, to render the cutting blades 41, 42 operative upon the actuation of solenoid 46.

A pair of identical photoelectric cell detecting means 50 are positioned for sensing the leading edge 23 of each successive article 20. The photoelectric cell detecting means 50 are respectively operatively connected with respective cutter means 40 for actuation thereof in predetermined timed relationship to effect severing of each of the connecting chains of stitches closely adjacent the leading edge 23 of each article 20.

The photoelectric cell detecting means 50 each includes a light source or lamp 51 mounted adjacent to and in substantial alignment with the blades 41 and 42 of a cutter means 40 transversely across and above the path of travel of the moving articles 20. The lamp 51 projects a light beam 51a downwardly through the path of travel of the moving articles 20 for reception by a photoelectric cell 52. The photoelectric cell 52 is responsive to light emanating from lamp 51 for actuating a control unit 53 (FIG. 2) which controls the actuation of solenoid 46. The control unit 53 is of conventional type employed with photoelectric cells and in the present instance is designed to momentarily activate solenoid 46 immediately upon the breakage of light beam 51a by the leading edge 23 only of each successive article 20. The immediate actuation of solenoid 46 pivots blades 41 and 42 of cutter means 40 to sever the connecting chain of stitches closely adjacent the leading edge 23 of each successive article 20 and free the trailing end of each connecting chain of stitches after which the cutting blades 41 and 42 are returned to their normally open position out of the path of the moving articles 20.

In FIGS. 3 and 4, there is shown in more detail the operation of one of the cutter means 40 and photoelectric cell detecting means 50 operatively connected therewith, wherein successive articles 20 have been overedge stitched along the longitudinal side edges 21 to form a connecting chain of stitches between the trailing edge 24 of a first article 20 and the leading edge 23 of a second successive article 20. In FIG. 3, the pair of cooperating cutting blades 41 and 42 are in their normally open position with the chain of stitches passing therebetween. It will be noted that the light beam 51a emanating from lamp 51 is being received by photoelectric cell 52. As illustrated in FIG. 4, immediately after the leading edge 23 of the second article 20 interrupts the light beam 51a, cutter means 40 is actuated to sever the connecting chain of stitches and free the trailing end of the chain of stitches. Since the photoelectric cell detecting means 50 is adjacent and in alignment with cutter means 40, the immediate actuation of cutter means 40 after the light beam 51a is interrupted insures that the connecting chain of stitches is severed closely adjacent the leading edge 23 of the second article 20. It will be readily apparent that similar chains of stitches connecting other successive articles 20 will be automatically severed in the same manner during the continuous operation of the stitching apparatus 10 to free the trailing end of each connecting chain of stitches.

The apparatus of this invention further includes a pair of suction means 60 each of which comprises suction conduits 61 mounted adjacent to and in substantial alignment with the path of longitudinal side edges 21 and 22, respectively, of successive articles 20 in a position subsequent to first cutter means 40. The conduits 61 have openings 61a at one end thereof disposed adjacent the path of travel of the moving articles 20 and are connected to a common conduit 62 at the other ends thereof which leads to any convenient suction source, as indicated schematically in the drawings. The suction created in conduits 61 draws the free trailing ends of the chains of stitches into the openings 61a after cutting by the first cutter means 40.

While the free trailing ends of the chains of stitches are held in conduits 61, they are severed closely adjacent the trailing edges 24 of successive articles 20 by a pair of second cutter means 65. The second cutter means 65 are mounted closely adjacent the path of longitudinal side edges 21 and 22 and adjacent the suction conduits 61 in cooperative relationship therewith for severing the chains of stitches as the successive articles 20 are advanced by conveyors 11 and 12. More particularly, the second cutter means 65 each comprises a pair of superimposed, cooperating, rotating cutting wheels 66 and 67. The cutting wheels 66 and 67 are disposed between the conduits 61 slightly beyond openings 61a. Their axis of rotation is substantially transverse to the moving articles 20 such that the chain of stitches will be drawn into severing relation between the pair of cutting wheels 66 and 67 by moving articles 20. The cutting wheels 66 of each cutter means 65 are mounted on and joined by a shaft 68 and cutting wheels 67 of each cutter means 65 are mounted on and joined by a shaft 69. The shafts 68 and 69 are rotated by an arrangement of gears 71 and 72 which as illustrated are driven by a pulley 73 which may in turn be driven by the motor $M$ driving conveyor units 11 and 12 or any other appropriate driving means (not shown).

With reference to FIGS. 5 and 6, there is illustrated in detail the further severing of a loose or previously severed connecting chain of stitches formed along longitudinal side edge 21 closely adjacent the trailing edge 24 of successive articles 20. In FIG. 5, successive articles 20 are shown wherein the connecting chain of stitches has been severed closely adjacent the leading edge 23 of the second article 20 to free the trailing end of the connecting chain of stitches. It will be noted that the free trailing end has been drawn through opening 61a into conduit 61 and is being held thereby as the articles 20 continue along their predetermined longitudinal path of travel. The chain of stitches is aligned and drawn into severing relation between the pair of cutting wheels 66 and 67.

In FIG. 6, it will be noted that the cutting wheels 66 and 67 have severed the chain of stitches closely adjacent the trailing edge 24 of article 20. Furthermore, upon being severed by cutting wheels 66 and 67, the chain of stitches is drawn through the suction conduit 61 and removed from interference with the continued operation of the stitching apparatus 10.

It can readily be appreciated in accordance with the foregoing description that the present invention is well adapted to accomplish the automatic severing and removal of a connecting chain of stitches formed between successive articles closely adjacent the trailing and leading edges thereof.

In the drawings and specification, there has been set forth a preferred embodiment of the invention and, although specific terms are employed, they are used in a generic and descriptive sense only and not for purposes of limitation.

What I claim is:

1. In an apparatus having means for advancing a plurality of spaced, successive articles of sheet material having longitudinal side edges, a leading edge and a trailing edge along a predetermined longitudinal path of travel, and stitching means mounted adjacent the moving articles for stitching the articles along at least one longitudinal side edge and forming at least one connecting chain of stitches between the trailing and leading edges of successive articles; the improvement of means for automatically severing and removing the chains of stitches closely adjacent the trailing and leading edges of successive articles, said means comprising
   first cutting means mounted adjacent the moving articles for severing the connecting chain of stitches closely adjacent the leading edge of each article and thereby freeing the trailing end of each connecting chain of stitches,
   sensing means operatively connected with said first cutting means and being positioned for sensing the leading edge of each successive article and for actuating said first cutting means in predetermined timed relationship,
   suction means mounted adjacent to and in substantial alignment with the path of travel of the moving articles and in a position subsequent to said first cutting means for drawing therein and holding the free trailing end of the chain of stitches after cutting thereof by said first cutting means, and
   second cutting means mounted adjacent the moving articles and adjacent said suction means in cooperative relationship therewith for severing the chain of stitches closely adjacent the trailing edge of each article while the chain of stitches is being held by said suction means and while each article is being advanced to free the remaining leading end of each connecting chain of stitches so that the severed chain of stitches will be removed by said suction means.

2. Apparatus, as set forth in claim 1, in which said stitching means comprises a separate stitching means mounted adjacent each longitudinal edge of the moving articles for stitching the articles along each longitudinal side edge and forming a connecting chain of stitches between the trailing and leading edges of successive articles along each longitudinal edge thereof, and in which said means for severing and removing the chains of stitches closely adjacent the trailing and leading edges of successive articles comprises separate means mounted adjacent each longitudinal edge of the moving articles for severing and removing each of the chains of stitches.

3. Apparatus, as set forth in claim 1, wherein said first cutting means comprises a pair of cooperating scissors-type cutting blades positioned in the open condition thereof such that the connecting chains of stitches will pass between said blades.

4. Apparatus, as set forth in claim 1, wherein said sensing means comprises photoelectric cell detecting means mounted adjacent to and in alignment with said cutting blades in the path of travel of the moving articles for sensing the leading edge of each moving article as the trailing end of each connecting chain of stitches is passing through said cutting blades for immediately actuating said first cutting means.

5. Apparatus, as set forth in claim 1, wherein said suction means comprises a suction conduit having an opening disposed adjacent to and in advance of said second cutting means in the path of travel of the moving articles for drawing therein and holding the free end of the chain of stitches in said opening.

6. Apparatus, as set forth in claim 5, wherein said second cutting means comprises a pair of superimposed, cooperating, rotating cutting wheel means having their axis of rotation substantially perpendicular to the moving articles and being disposed between said opening in said suction conduit and the moving articles in such a position that the chain of stitches will be drawn into severing relation between said pair of cutting wheels.

7. In an apparatus having means for advancing a plurality of spaced, successive articles of sheet material having longitudinal side edges, a leading edge and a trailing edge along a predetermined longitudinal path of travel, and stitching means mounted adjacent the moving articles for stitching the articles along at least one longitudinal side edge and forming at least one connecting chain of stitches between the trailing and leading edges of successive articles; the improvement of means for automatically severing and removing the chains of stitches closely adjacent the trailing and leading edges of successive articles, said means comprising
   first cutting means comprising a pair of cooperating scissors-type cutting blades mounted adjacent the moving articles and positioned in the open condition thereof such that the connecting chains of stitches will pass between said blades for severing the connecting chain of stitches closely adjacent the leading edge of each article and thereby freeing the trailing end of each connecting chain of stitches,
   sensing means comprising photoelectric cell detecting means mounted adjacent to and in alignment with said cutting blades in the path of travel of the moving articles for sensing the leading edge of each successive article as the trailing end of each connecting chain of stitches is passing through said cutting blades for immediately actuating said cutting blades,
   suction means comprising a suction conduit having an opening positioned in substantial alignment with the path of travel of the moving articles and in a position subsequent to said first cutting means for drawing therein and holding the free trailing end of the chain of stitches after cutting thereof by said first cutting means, and
   second cutting means comprising a pair of superimposed, cooperating, rotating cutting wheel means having their axis of rotation substantially perpendicular to the moving articles and being disposed between said opening in said suction conduit and the moving articles in such a position that the chain of stitches will be drawn into severing relation between said pair of cutting wheels while the chain of stitches is being held by said suction means and while each article is being advanced to free the remaining leading end of each connecting chain of stitches so that the severed chain of stitches will be removed by said suction means.

8. Apparatus, as set forth in claim 7, in which said stitching means comprises a separate stitching means mounted adjacent each longitudinal edge of the moving articles for stitching the articles along each longitudinal side edge and forming a connecting chain of stitches between the trailing and leading edges of successive articles along each longitudinal edge thereof, and in which said means for severing and removing the chains of stitches closely adjacent the trailing and leading edges of successive articles comprises separate means mounted adjacent each longitudinal edge of the moving articles for severing and removing each of the chains of stitches.

9. A method for severing and removing the chains of stitches formed between the trailing end and the leading end of successive articles comprising the steps of
   advancing the successive articles with the connecting chains of stitches therebetween along a predetermined longitudinal path of travel,
   severing the connecting chain of stitches closely adjacent the leading edge of each article and thereby freeing the trailing end of each connecting chain of stitches,
   drawing and holding by suction the free trailing end of the chain of stitches in a generally transverse direction to the path of travel of the successive articles, and severing the chain of stitches closely adjacent the trailing edge of each article while the chain of stitches is being held by suction and while each article is being advanced to free the remaining leading end of each connecting chain of stitches.

10. The method, as set forth in claim 9, including the step of sensing the leading edge of each successive article while simultaneously severing the trailing end of each connecting chain of stitches closely adjacent the leading edge of each successive article.